United States Patent
Kawaguchi

[19]

[11] Patent Number: 5,931,896
[45] Date of Patent: Aug. 3, 1999

[54] FLOATING POINT ADDITION AND SUBTRACTION ARITHMETIC CIRCUIT PERFORMING PREPROCESSING OF ADDITION OR SUBTRACTION OPERATION RAPIDLY

[75] Inventor: Tadaharu Kawaguchi, Yamanashi, Japan

[73] Assignee: NEC Corporation, Tokyo, Japan

[21] Appl. No.: 08/788,445

[22] Filed: Jan. 29, 1997

[30] Foreign Application Priority Data

Jan. 29, 1996 [JP] Japan ................................. 8-012645

[51] Int. Cl.⁶ ........................................................ G06F 7/50
[52] U.S. Cl. ................................................................ 708/670
[58] Field of Search ............................... 364/745, 748, 364/748.05, 754, 715.01, 715.04, 768, 748.03, 715.03

[56] References Cited

U.S. PATENT DOCUMENTS

| | | | |
|---|---|---|---|
| 4,468,748 | 8/1984 | Blau et al. | 364/748 |
| 4,562,553 | 12/1985 | Mattedi et al. | 364/745 |
| 4,800,516 | 1/1989 | Si et al. | 364/748 |
| 4,864,527 | 9/1989 | Peng et al. | 364/748 |
| 4,928,259 | 5/1990 | Galbi et al. | 364/745 |
| 5,166,898 | 11/1992 | Ishihara | 364/748 |
| 5,319,588 | 6/1994 | Haines et al. | 364/745 |
| 5,471,410 | 11/1995 | Bailey et al. | 364/715.01 |
| 5,568,412 | 10/1996 | Han et al. | 364/748 |
| 5,627,774 | 5/1997 | Schwarz et al. | 364/715.04 |
| 5,726,927 | 3/1998 | Wolrich et al. | 364/754 |
| 5,742,537 | 4/1998 | Wolrich et al. | 364/748.05 |

FOREIGN PATENT DOCUMENTS 3-171228  7/1991  Japan .

*Primary Examiner*—Hassan Kizou
*Assistant Examiner*—Omar A. Omar
*Attorney, Agent, or Firm*—Foley & Lardner

[57] ABSTRACT

A floating point addition and subtraction circuit includes a comparison subtraction circuit receiving two operands to be processed for making a comparison in the size between their exponent parts so as to subtract the smaller exponent part from the larger one, the comparison subtraction circuit providing the comparison result and the subtraction result. A mantissa selecting circuit and a shift circuit align the mantissa of the operand. Leading zero counting circuit counts the number of zeros successively positioned in the high order direction from the least significant bit of the mantissa of the operand having the smaller operand. Comparator circuit compares the counting result and the subtraction result by the comparison subtraction circuit, to thereby detect a sticky bit according to the comparison result. An absolute value addition and subtraction arithmetic circuit receives the aligned mantissas of the two operands and the detected sticky bit, and performs an addition or subtraction operation on the operands.

8 Claims, 2 Drawing Sheets

FLOATING POINT ADDITION AND SUBTRACTION ARITHMETIC CIRCUIT PERFORMING PREPROCESSING OF ADDITION OR SUBTRACTION OPERATION RAPIDLY

BACKGROUND OF THE INVENTION

1. Field of the Invention

The present invention relates to a floating point addition and subtraction arithmetic circuit. More particularly, it relates to a floating point addition and subtraction arithmetic circuit capable of performing preprocessing in addition or subtraction operations rapidly, which comprises a circuit for detecting a sticky bit.

2. Description of the Related Art

In order to perform the floating point arithmetic rapidly, various means have been proposed in the arithmetic techniques using a computer. To speed up the arithmetic operation, for example, carry transfer time accompanied by the rounding is reduced in this kind of technique. As another example, an effective high speed arithmetic operation can be realized by speeding up the timing for creating a sticky bit. A sticky bit means the logical OR of bits shifted out by right-shifting the mantissa of the smaller exponent number of two numerals represented by the floating point number in order to conform the exponent parts with each other.

As one example of the prior art of reducing the carry transfer time accompanied by the rounding, and which is not a directly related art, "Floating Point Arithmetic System" is disclosed in Japanese Patent Publication Laid-Open No. 3-171228. Herein, disclosed is a floating point arithmetic system including a mantissa creating means for aligning mantissas of operands to be processed and creating two sets of operand mantissas from the mantissa and the reverse mantissa, a rounding judging means for determining the necessity of the increment in the respective roundings when assuming that the normalization of the arithmetic solution is necessary and assuming that it is not necessary, a first adding means for calculating a first solution including the rounding when assuming that the normalization of the arithmetic solution is not necessary, a second adding means for calculating a second solution including the rounding when assuming that the normalization of the arithmetic solution is not necessary, a selecting means for selecting a true solution from the first and second solutions, and a normalizing means for normalizing the selected true solution to obtain the arithmetic result of the solution in the operand mantissa, and the system in which the judgment of the rounding is performed in each case depending on the necessity of the normalization of the arithmetic solution prior to the arithmetic operation of the mantissa, and according to the judgment result, the arithmetic operation and the rounding operation in the mantissa are simultaneously performed, so to reduce the carry transfer times in the arithmetic process, thereby realizing a high speed addition or subtraction operation.

In the conventional floating point addition and subtraction arithmetic circuit, a sticky bit is detected as follows. First of all, the exponent parts of input operands are compared with each other. The mantissa of the operand having the smaller exponent part is shifted to the right (on the side of the least significant bit) by the difference of the exponent parts so as to align the smaller exponent part at the larger exponent part. All the bits shifted out from the mantissa are ORed.

A circuit for detecting a sticky bit as mentioned above, for example, has the structure as FIG. 3, accompanied by an arithmetic circuit for aligning the operands to be processed by digit. In FIG. 3, a comparison subtraction circuit 110 makes a comparison between the respective exponent parts of the first and second operands, and subtracts the smaller exponent part from the larger one of the first and second operands, so to provide a comparison signal 111 and a shift amount signal 112. For example, when the exponent part of the first operand is larger, the exponent part of the second operand is subtracted from the exponent part of the first operand and the subtraction result is supplied to a shift circuit 130 as the shift amount signal 112.

A mantissa selecting circuit 120 selectively delivers the mantissa of input operand on the basis of the comparison signal 111. The circuit 120 sends the mantissa of the input operand having the larger exponent part to an absolute value addition and subtraction arithmetic circuit 160, and sends the mantissa of the input operand having the smaller exponent part to the shift circuit 130. In the above example, the mantissa of the first operand is sent to the absolute value addition and subtraction arithmetic circuit 160 and the mantissa of the second operand is sent to the shift circuit 130.

The shift circuit 130 shifts the mantissa received from the mantissa selecting circuit 120 to the right according to the shift amount signal 112, so as to align the operand by digit. The shift circuit 130 delivers the shift result to the absolute value addition and subtraction arithmetic circuit 160, and supplies all the bits that are shifted out from the mantissa part after the operand is right-shifted, to an OR circuit 140. In the above example, the mantissa of the second operand is shifted to the right according to the shift amount signal 112. All the bits shifted out of the bit width of the mantissa on the right side are delivered to the OR circuit 140.

The OR circuit 140 estimates the logical OR of all the bits shifted out, received from the shift circuit 130, thereby to detect the sticky bit, and supplies it to the absolute value addition and subtraction arithmetic circuit 160.

The absolute value addition and subtraction arithmetic circuit 160 performs the absolute value addition or subtraction operation on the mantissa directly received from the mantissa selecting circuit 120, the mantissa having been aligned which is received from the shift circuit 130, and the sticky bit received from the OR circuit 140.

As set forth hereinabove, in the conventional floating point addition and subtraction arithmetic circuit, sticky bit detection is realized by estimating the logical OR of the bits overflown after the operand is right-shifted. Therefore, it takes a lot of time in the preprocessing before starting the addition or subtraction operation, which results in disadvantageously decreasing the efficiency.

SUMMARY OF THE INVENTION

A first object of the present invention is to provide a floating point addition and subtraction arithmetic circuit capable of performing the detection processing of the sticky bit and the alignment processing simultaneously, paying attention to the bit string and the shift amount of the mantissa right-shifted, to shorten the time necessary for the preprocessing in the addition or subtraction operation, thereby to speed up the floating point addition and subtraction arithmetic operation.

According to one aspect of the invention, a floating point addition and subtraction arithmetic circuit of performing addition or subtraction operation after operand to be processed by floating point arithmetic operation is aligned by digit, comprises a comparison subtraction means for receiving two operands to be processed, making a comparison in the size between exponent parts of said two operands, subtracting smaller exponent part from larger one, and outputting comparison result and subtraction result;

a digit alignment means for receiving the two operands to be processed, as well as the comparison result and subtraction result by said comparison subtraction means, aligning the mantissa of the operand having the smaller exponent part so as to correspond with the mantissa of the operand having the larger exponent part;

a sticky bit detecting means for receiving the two operands to be processed, as well as the comparison result and subtraction result by said comparison subtraction means, and making a comparison between the subtraction result by said comparison subtraction means and the number of zeros successively positioned in the high order direction from the least significant bit in the mantissa of the operand having the smaller exponent part for detecting sticky bit according to the comparison result; and an addition and subtraction means receiving the mantissa of the two operands having been aligned by said digit alignment means and the sticky bit detected by said sticky bit detecting means for performing addition or subtraction operation on the two operands.

In the preferred embodiment, the digit alignment means and said sticky bit detecting means perform each operation simultaneously.

In the preferred embodiment, the sticky bit detecting means includes a leading zero counting means for receiving the two operands to be processed as well as the comparison result by said comparison subtraction means, counting the number of zeros successively positioned in the high order from the least significant bit after the mantissa of the operand having the smaller exponent part is selected; and a comparator means for receiving the count value by said leading zero counting means as well as the arithmetic result by said comparison subtraction means, making a comparison between the arithmetic result and the count value, defining the sticky bit as "1" in the case where the value of the arithmetic result is larger than the count value and defining the sticky bit as "0" in the other case.

In another preferred embodiment, the digit alignment means includes a mantissa selecting means for receiving the two operands to be processed as well as the comparison result by said comparison subtraction means, selecting mantissa of the operand having the larger exponent part, supplying the mantissa of the operand to said addition and subtraction means; and a shift means for receiving the mantissa of the operand having the smaller exponent part from said mantissa selecting means as well as the arithmetic result by said comparison subtraction means, and right-shifting the received mantissa of the operand according to the arithmetic result, the sticky bit detecting means includes a leading zero counting means for receiving the two operands to be processed as well as the comparison result by said comparison subtraction means, counting the number of zeros successively positioned in the high order from the least significant bit after the mantissa of the operand having the smaller exponent part is selected; and a comparator means for receiving the count value by said leading zero counting means as well as the arithmetic result by said comparison subtraction means for making a comparison therebetween, and defining the sticky bit as "1" in the case where the value of the arithmetic result is larger than the count value and defining the sticky bit as "0" in the other case, and the mantissa selecting means and shift means of said digit alignment means and said leading zero counting means and comparator means of said sticky bit detecting means perform each operation simultaneously.

In this case, the operand to be processed includes a mantissa of 56 bits, with the most significant bit defined as a hidden bit and the three least significant bits extended to store a guard bit, a rounding bit and a sticky bit.

In another preferred embodiment, the operand to be processed includes mantissa of 56 bits, with the most significant bit defined as a hidden bit and the three least significant bits extended to store a guard bit, a rounding bit and a sticky bit;

the sticky bit detecting means includes a leading zero counting means for receiving the two operands to be processed as well as the comparison result by said comparison subtraction means, counting the number of zeros successively positioned in the high order from the least significant bit after the mantissa of the operand having the smaller exponent part is selected, and a comparator means for receiving the count value by said leading zero counting means as well as the arithmetic result by said comparison subtraction means, making a comparison between the arithmetic result and the count value, and defining the sticky bit as "1" in the case where the value of the arithmetic result is larger than the count value and defining the sticky bit as "0" in the other case;

the leading zero counting means counts the number of zeros successively positioned in the high order direction from the bit next high order to the guard bit after "0" is shifted in the two bits defined for storing the guard bit and the rounding bit; and the comparison means defines the sticky bit as "1" when the value of the arithmetic result by said comparison subtraction means is larger than "2", and defines the sticky bit as "0" when the value of the arithmetic result by said comparison subtraction means is "2" or less.

In the above-mentioned embodiment, the operand to be processed includes the mantissa of 56 bits with the most significant bit defined as a hidden bit, and said digit alignment means extends three bits in the least significant position in the mantissa of the operand so as to store the guard bit, the rounding bit and the sticky bit;

the sticky bit detecting means includes a leading zero counting means for receiving the two operands to be processed as well as the comparison result by said comparison subtraction means, counting the number of zeros successively positioned in the high order from the least significant bit after the mantissa of the operand having the smaller exponent part is selected, and a comparator means for receiving the count value by said leading zero counting means as well as the arithmetic result by said comparison subtraction means, making a comparison between the arithmetic result and the count value, and defining the sticky bit as "1" in the case where the value of the arithmetic result is larger than the count value and defining the sticky bit as "0" in the other case; and in the processing of said leading zero counting means and said comparator means in said sticky bit detecting means running simultaneously to the processing of said digit alignment means, the leading zero counting means counts the number of zeros successively positioned in the high order direction from the bit next high order to the guard bit after "0" is shifted in the two bits defined for storing the guard bit and the rounding bit by said digit alignment means, and the comparison means defines the sticky bit as "1" when the value of the arithmetic result by said comparison subtraction means is larger than "2" and defines the sticky bit as "0" when the value of the arithmetic result by said comparison subtraction means is "2" or less.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
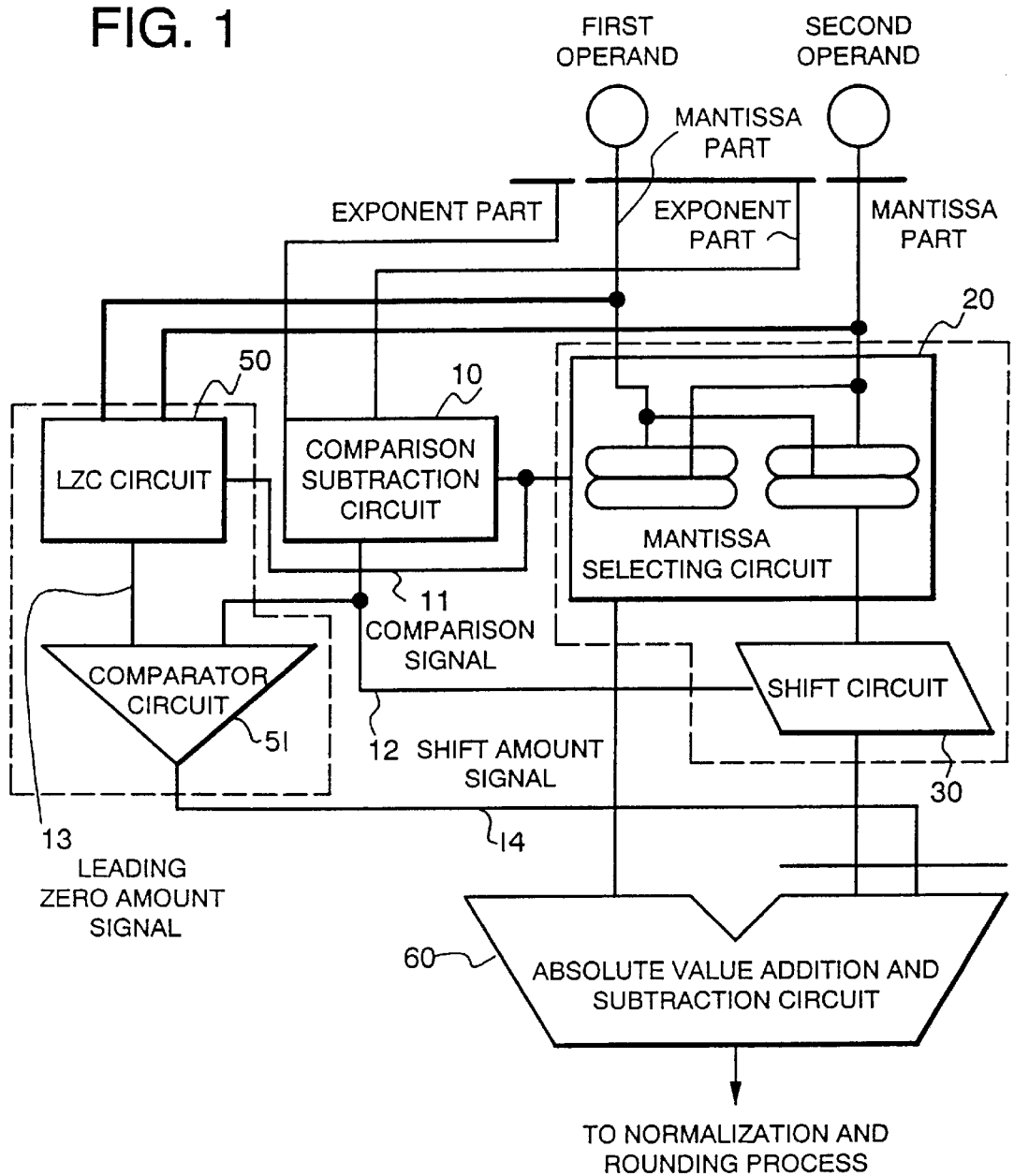
FIG. 1 is a block diagram showing a floating point addition and subtraction arithmetic circuit according to an embodiment of the present invention.

FIG. 1 is a block diagram showing a floating point addition and subtraction arithmetic circuit according to an embodiment of the present invention.

As illustrated in FIG. 1, an alignment circuit of the embodiment includes a leading zero coefficient circuit (LZC circuit) 50 and a comparator circuit 51 for detecting a sticky bit, a comparison subtraction circuit 10, a mantissa selecting circuit 20, a shift circuit 30 and an absolute value addition and subtraction arithmetic circuit 60. FIG. 1 shows only the characteristic structure of the embodiment, namely, the structure for digit alignment of the operands and for detection of a sticky bit, while the description of the other general structural elements are not illustrated there. It is needless to say that the elements for normalization and rounding processing are included.

Figure 2:
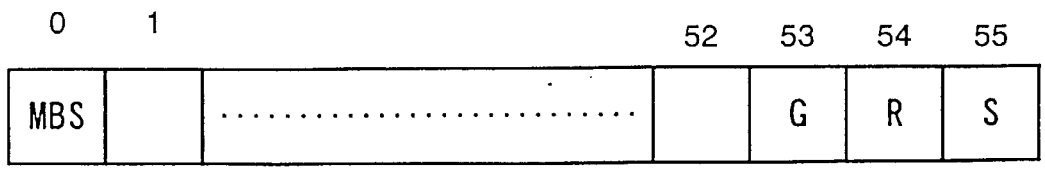
FIG. 2 is a view showing a format of the mantissa of the operand to be processed by the floating point operation according to the embodiment.
Figure 3:
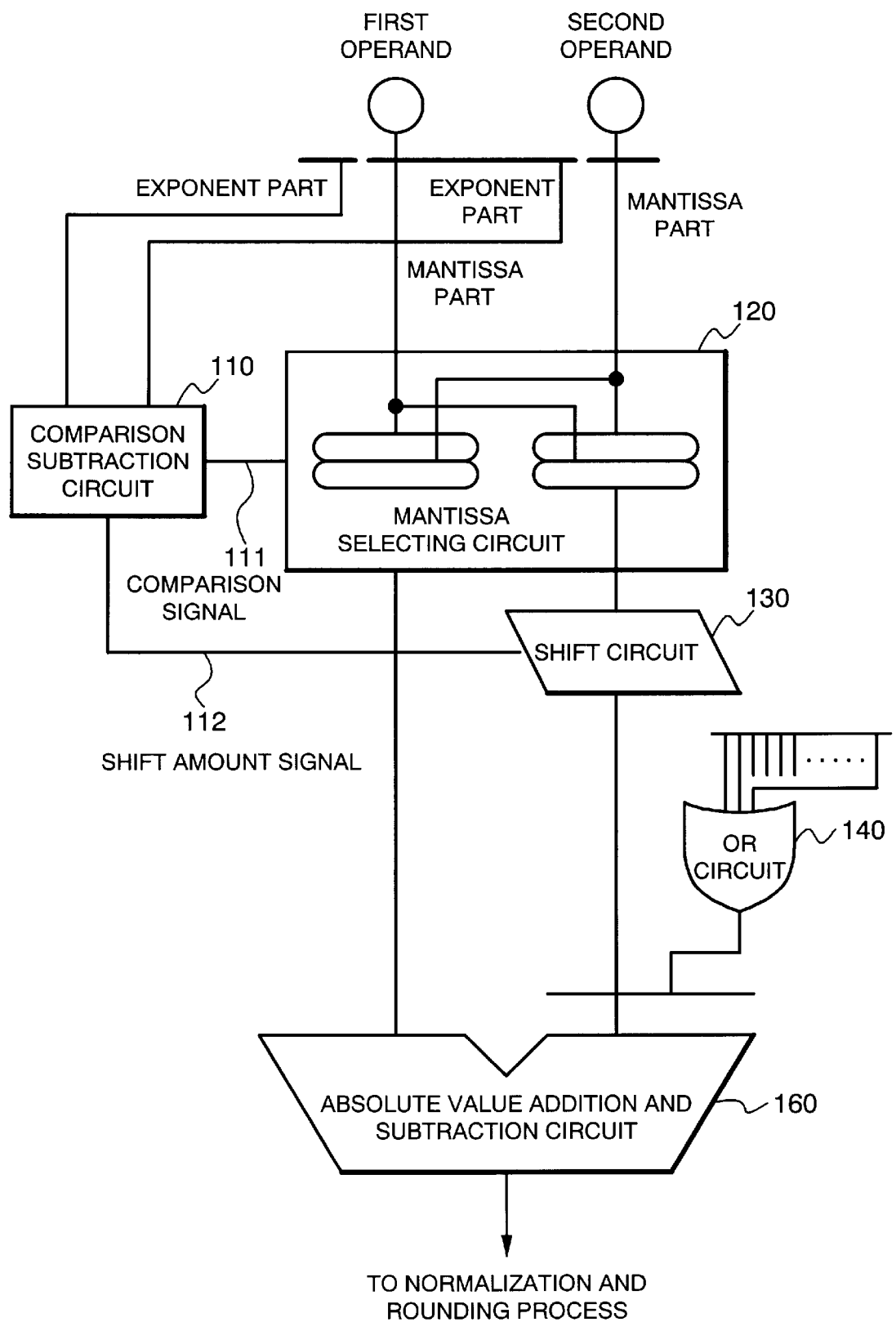
FIG. 3 is a block diagram showing a conventional floating point addition and subtraction arithmetic circuit.

FIG. 2 is a view showing a format of the mantissa of the operand to be processed by the embodiment.

As illustrated in FIG. 2, the mantissa of the operand to be processed by the embodiment consists of 56 bits, in which the most significant bit (MSB, bit 0) is regarded as a hidden bit and 1–52 bits are regarded as significant digits. Three bits of the least significant position of the mantissa are extended to set up the guard bit G, the rounding bit R and the sticky bit S representing the logical OR of all the bits of less significant position than that of the rounding bit R. A block diagram shown in FIG. 1 shows a part of the floating point addition and subtraction arithmetic circuit in accordance with the IEEE Standard P754, where the sticky bit in the mantissa as shown in FIG. 2 is detected as preprocessing of the addition or subtraction operation.

In FIG. 1, making a comparison between the exponent part E1 of the first operand and the exponent part E2 of the second operand, the comparison subtraction circuit 10 subtracts the smaller one from the larger one, and supplies the comparison signal 11 and the shift amount signal 12. The comparison signal 11 is a signal indicating the comparison result between the exponent part E1 of the first operand and the exponent part E2 of the second operand. For example, when E1 is larger than E2 (E1>E2), the comparison signal 11 is "1", and when E1 is not larger than E2, the comparison signal 11 is "0". The shift amount signal 12 indicates the subtraction result of the exponent parts E1 and E2, when E1 is larger than E2 (E1>E2), the result is obtained by E1−E2, and when E1 is not larger than E2, the result is obtained by E2−E1. The comparison signal 11 supplied from the comparison subtraction circuit 10 is delivered to the mantissa selecting circuit 20 and the LZC circuit 50. The shift amount signal 12 is delivered to the shift circuit 30 and the comparator circuit 51.

The mantissa selecting circuit 20 receives the first and second operands to be processed, and selectively sends the mantissa of input operand according to the comparison result by the comparison subtraction circuit 10. The mantissa of the input operand having the larger exponent part is delivered to the absolute value addition and subtraction arithmetic circuit 60 and the mantissa of the input operand having the smaller exponent part is delivered to the shift circuit 30. In the above example, when the comparison signal 11 is "1", the mantissa of the first operand is delivered to the absolute value addition and subtraction arithmetic circuit 60, and the mantissa of the second operand is delivered to the shift circuit 30. Alternatively, when the comparison signal 11 is "0", the mantissa of the second operand is delivered to the absolute value addition and subtraction arithmetic circuit 60 and the mantissa of the first operand is delivered to the shift circuit 30.

The shift circuit 30 shifts the mantissa received from the mantissa selecting circuit 20 to the right on the side of the least significant bit according to the shift amount signal 12. As a result, the exponent part E1 becomes equal to the exponent part E2, so that the mantissa of the input operand having the smaller exponent part can be aligned to correspond with the mantissa of the input operand having the larger exponent part. The shift result is delivered to the absolute value addition and subtraction arithmetic circuit 60.

The LZC circuit 50 selects the mantissa having the smaller exponent part from the first and second operands according to the comparison signal 11 so to perform a leading zero operation. In other words, the number of the successive values "0" is counted from the least significant bit of the selected mantissa in the high order direction. The counted value is delivered to the comparator circuit 51 as a leading zero amount signal 13.

The comparison circuit 51, receiving the leading zero amount signal 13 created by the LZC circuit 50 and the shift amount signal 12, makes a comparison therebetween, and provides the sticky bit signal 14 indicating the comparison result. For example, when the leading zero amount signal 13 is as large as the shift amount signal 12, or larger than that, the sticky bit signal 14 is defined as "0". When the shift amount signal 12 is larger than the leading zero amount signal 13, the sticky bit signal 14 is defined as "1". The supplied sticky bit signal 14 is delivered to the absolute value addition and subtraction arithmetic circuit 60 as the sticky bit S.

The sticky bit S represents the logical OR of all the bits in the less significant position than that of the rounding bit R after the mantissa is right-shifted for digit alignment. When the shift amount signal 12 is larger than the leading zero amount signal 13, there exists at least "1" in the bit string which was shifted out, so that the sticky bit S can be detected obviously.

The absolute value addition and subtraction arithmetic circuit 60 performs an absolute value addition and subtraction operation on the mantissa directly received from the mantissa selecting circuit 20, the mantissa having been aligned which is received from the shift circuit 30, and the sticky bit S received from the comparator circuit 51.

An operation of the embodiment having the above structure will be described hereinafter. In the following example, the case where the exponent part of the first operand is larger than that of the second operand is taken for example.

First of all, two operands to be processed (the first and second operands) are entered. The mantissas of the two operands are respectively delivered to the mantissa selecting circuit 20 and the LZC circuit 50, and the exponent parts are delivered to the comparison subtraction circuit 10. The exponent parts of the first and second operands are compared with each other in the comparison subtraction circuit 10. Since the exponent part of the first operand is larger than that of the second one, the comparison signal 11 turns to "1". The operation result of subtracting the exponent part of the second operand from that of the first one is supplied as the shift amount signal 12. The mantissa selecting circuit 20 delivers the mantissa of the first operand to the absolute value addition and subtraction arithmetic circuit 60 according to the value of the comparison signal 11 being "1", and delivers the mantissa of the second operand to the shift circuit 30. The shift circuit 30 shifts the mantissa of the second operand to the right according to the shift amount signal 12. The shift result is extended to the guard bit G, the rounding bit R and the sticky bit S, so to be delivered to the absolute value addition and subtraction arithmetic circuit 60.

On the other hand, after the comparison subtraction circuit 10 has sent the comparison signal 11 and the shift amount signal 12, the LZC circuit 50 performs a leading zero operation simultaneously to the operation of the mantissa selecting circuit 20 and the shift circuit 30. Since the value of the comparison signal 11 is "1" in this case, it performs the leading zero operation from the least significant bit of the mantissa of the second operand, and delivers the leading zero amount signal 13 to the comparator circuit 51. The mantissa of the input operand to be processed by the leading zero operation is not extended to the guard bit G and the rounding bit R at this point. Therefore, "0" is shifted in for two bits of the guard bit G and the rounding bit R, and the leading zero operation is performed on bits 52-1.

The comparator circuit 51 makes a comparison between the leading zero amount signal 13 and the shift amount signal 12, and delivers the comparison result to the absolute value addition and subtraction arithmetic circuit 60 as the sticky bit S (sticky bit signal 14). For example, when the mantissa of the second operand is all "1", the leading zero amount is "2". When the right-shifted amount of the mantissa for digit alignment is larger than "2", the bits shifted out necessarily includes "1", so that the sticky bit proves to be "1". When the right-shifted amount of the mantissa for digit alignment is "2" or less, the sticky bit proves to be "0".

The absolute value addition and subtraction arithmetic circuit 60 performs an addition or subtraction operation on the mantissa of the first operand received from the mantissa selecting circuit 20 and the mantissa having been aligned which is received from the shift circuit 30, and thereafter proceeding to a normalization and rounding process.

As set forth hereinabove, according to the present invention, since a circuit for indicating the existence of sticky bit when the right-shifted amount of the mantissa for aligning the exponent parts is larger than the numeral of the input operand having successive "0" from the least significant bit at the result of the comparison therebetween, is provided in the floating point addition and subtraction arithmetic circuit of performing the rounding operation, it is not necessary to OR all the bits shifted out from the mantissa after the mantissa is right-shifted, in order to detect the sticky bit. Further the floating point addition and subtraction arithmetic circuit according to the present invention can perform the detecting operation of a sticky bit and the digit alignment operation of the operands at the same time. Therefore, the present invention can shorten the time necessary for the preprocessing of the floating point addition and subtraction arithmetic operation including the detecting operation of a sticky bit, and thereby speeding up the floating point addition or subtraction operation advantageously.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments within the scope of the appended claims.

What is claimed is:

1. A floating point addition and subtraction arithmetic circuit for performing addition or subtraction operation after an operand to be processed by floating point arithmetic operation is aligned by digit, comprising:

a comparison subtraction means for receiving two operands to be processed, making a comparison in the size between exponent parts of said two operands, subtracting a smaller exponent part from a larger one, and outputting a comparison result and a subtraction result;

a digit alignment means for receiving the two operands to be processed, as well as the comparison result and subtraction result by said comparison subtraction means, and aligning the mantissa of the operand having the smaller exponent part so as to correspond with the mantissa of the operand having the larger exponent part;

a sticky bit detecting means, separate from said digit alignment means, for receiving the two operands to be processed, as well as the comparison result and subtraction result by said comparison subtraction means, and making a comparison between the subtraction result by said comparison subtraction means and the number of zeros successively positioned in the high order direction from the least significant bit in the mantissa of the operand having the smaller exponent part for detecting a sticky bit according to the comparison result; and an addition and subtraction means receiving the mantissa of the two operands having been aligned by said digit alignment means and the sticky bit detected by said sticky bit detecting means, for performing addition or subtraction operation on the two operands.

2. A floating point addition and subtraction arithmetic circuit as set forth in claim 1, wherein said digit alignment means and said sticky bit detecting means perform each operation simultaneously.

3. A floating point addition and subtraction arithmetic circuit for performing addition or subtraction operation after an operand to be processed by floating point arithmetic operation is aligned by digit, comprising:

a comparison subtraction means for receiving two operands to be processed, making a comparison in the size between exponent parts of said two operands, subtracting a smaller exponent part from a larger one, and outputting a comparison result and a subtraction result;

a digit alignment means for receiving the two operands to be processed, as well as the comparison result and subtraction result by said comparison subtraction means, and aligning the mantissa of the operand having the smaller exponent part so as to correspond with the mantissa of the operand having the larger exponent part;

a sticky bit detecting means for receiving the two operands to be processed, as well as the comparison result and subtraction result by said comparison subtraction means, and making a comparison between the subtraction result by said comparison subtraction means and the number of zeros successively positioned in the high order direction from the least significant bit in the mantissa of the operand having the smaller exponent part for detecting sticky bit according to the comparison result; and an addition and subtraction means receiving the mantissa of the two operands having been aligned by said digit alignment means and the sticky bit detected by said sticky bit detecting means, for performing addition or subtraction operation on the two operands wherein said sticky bit detecting means including:

a leading zero counting means for receiving the two operands to be processed as well as the comparison result by said comparison subtraction means, counting the number of zeros successively positioned in the high order from the least significant bit after the mantissa of the operand having the smaller exponent part is selected; and a comparator means for receiving the count value by said leading zero counting means as well as the arithmetic result by said comparison subtraction means, making a comparison between the arithmetic result and the count value, defining the sticky bit as "1" in the case where the value of the arithmetic result is larger than the count value and defining the sticky bit as "0" otherwise.

4. A floating point addition and subtraction arithmetic circuit for performing addition or subtraction operation after an operand to be processed by floating point arithmetic operation is aligned by digit, comprising:

a comparison subtraction means for receiving two operands to be processed, making a comparison in the size between exponent parts of said two operands, subtracting a smaller exponent part from a larger one, and outputting a comparison result and a subtraction result;

a digit alignment means for receiving the two operands to be processed, as well as the comparison result and subtraction result by said comparison subtraction means, and aligning the mantissa of the operand having the smaller exponent part so as to correspond with the mantissa of the operand having the larger exponent part;

a sticky bit detecting means for receiving the two operands to be processed, as well as the comparison result and subtraction result by said comparison subtraction means, and making a comparison between the subtraction result by said comparison subtraction means and the number of zeros successively positioned in the high order direction from the least significant bit in the mantissa of the operand having the smaller exponent part for detecting sticky bit according to the comparison result; and an addition and subtraction means receiving the mantissa of the two operands having been aligned by said digit alignment means and the sticky bit detected by said sticky bit detecting means, for performing addition or subtraction operation on the two operands wherein said digit alignment means including:

a mantissa selecting means for receiving the two operands to be processed as well as the comparison result by said comparison subtraction means, selecting a mantissa of the operand having the larger exponent part, and supplying the mantissa of the operand to said addition and subtraction means; and a shift means for receiving the mantissa of the operand having the smaller exponent part from said mantissa selecting means as well as the arithmetic result by said comparison subtraction means, and right-shifting the received mantissa of the operand according to the arithmetic result, said sticky bit detecting means including:

a leading zero counting means for receiving the two operands to be processed as well as the comparison result by said comparison subtraction means, and counting the number of zeros successively positioned in the high order from the least significant bit after the mantissa of the operand having the smaller exponent part is selected; and a comparator means for receiving the count value by said leading zero counting means as well as the arithmetic result by said comparison subtraction means for making a comparison therebetween, and defining the sticky bit as "1" in the case where the value of the arithmetic result is larger than the count value and defining the sticky bit as "0" otherwise, and said mantissa selecting means and shift means of said digit alignment means and said leading zero counting means and comparator means of said sticky bit detecting means perform each operation simultaneously.

5. A floating point addition and subtraction arithmetic circuit as set forth in claim 1, wherein the operand to be processed includes a mantissa of 56 bits, with the most significant bit defined as a hidden bit and the three least significant bits extended to store a guard bit, a rounding bit and a sticky bit.

6. A floating point addition and subtraction arithmetic circuit as set forth in claim 1, wherein the operand to be processed includes a mantissa of 56 bits, with the most significant bit defined as a hidden bit and the three least significant bits extended to store a guard bit, a rounding bit and a sticky bit;

said sticky bit detecting means including,
- a leading zero counting means for receiving the two operands to be processed as well as the comparison result by said comparison subtraction means, counting the number of zeros successively positioned in the high order from the least significant bit after the mantissa of the operand having the smaller exponent part is selected, and
- a comparator means for receiving the count value by said leading zero counting means as well as the arithmetic result by said comparison subtraction means, making a comparison between the arithmetic result and the count value, and defining the sticky bit as "1" in the case where the value of the arithmetic result is larger than the count value and defining the sticky bit as "0" otherwise;

said leading zero counting means counts the number of zeros successively positioned in the high order direction from the bit next high order to the guard bit after "0" is shifted in the two bits defined for storing the guard bit and the rounding bit; and said comparison means defines the sticky bit as "1" when the value of the arithmetic result by said comparison subtraction means is larger than "2" and defines the sticky bit as "0" when the value of the arithmetic result by said comparison subtraction means is "2" or less.

7. A floating point addition and subtraction arithmetic circuit as set forth in claim 1, wherein the operand to be processed includes a mantissa of 56 bits with the most significant bit defined as a hidden bit, and said digit alignment means extends three bits in the least significant position in the mantissa of the operand so as to store the guard bit, the rounding bit and the sticky bit.

8. A floating point addition and subtraction arithmetic circuit as set forth in claim 1, wherein the operand to be processed includes a mantissa of 56 bits with the most significant bit defined as a hidden bit, and said digit alignment means extends three bits in the least significant position in the mantissa of the operand so as to store the guard bit, the rounding bit and the sticky bit;

said sticky bit detecting means including;
- a leading zero counting means for receiving the two operands to be processed as well as the comparison result by said comparison subtraction means, counting the number of zeros successively positioned in the high order from the least significant bit after the mantissa of the operand having the smaller exponent part is selected, and
- a comparator means for receiving the count value by said leading zero counting means as well as the arithmetic result by said comparison subtraction means, making a comparison between the arithmetic result and the count value, and defining the sticky bit as "1" in the case where the value of the arithmetic result is larger than the count value and defining the sticky bit as "0" otherwise; and in the processing of said leading zero counting means and said comparator means in said sticky bit detecting means running simultaneously to the processing of said digit alignment means, said leading zero counting means counts the number of zeros successively positioned in the high order direction from the bit next high order to the guard bit after "0" is shifted in the two bits defined for storing the guard bit and the rounding bit by said digit alignment means, and said comparison means defines the sticky bit as "1" when the value of the arithmetic result by said comparison subtraction means is larger than "2" and defines the sticky bit as "0" when the value of the arithmetic result by said comparison subtraction means is "2" or less.

* * * * *